United States Patent
Takahashi et al.

(10) Patent No.: US 8,353,799 B2
(45) Date of Patent: Jan. 15, 2013

(54) CONTROL OF AND CONTROL METHOD FOR VEHICLE CONTINUOUSLY VARIABLE TRANSMISSION

(75) Inventors: Seiichiro Takahashi, Isehara (JP); Hiroyasu Tanaka, Atsugi (JP); Ryousuke Nonomura, Kawasaki (JP); Jouji Seki, Zama (JP); Takuichiro Inoue, Fujisawa (JP); Mamiko Inoue, Ebina (JP)

(73) Assignees: Nissan Motor Co., Ltd., Yokohama-shi (JP); JATCO Ltd, Fuji-shi (JP)

( * ) Notice: Subject to any disclaimer, the term of this patent is extended or adjusted under 35 U.S.C. 154(b) by 277 days.

(21) Appl. No.: 12/836,128

(22) Filed: Jul. 14, 2010

(65) Prior Publication Data
US 2011/0015837 A1  Jan. 20, 2011

(30) Foreign Application Priority Data

Jul. 17, 2009  (JP) .................. 2009-169171

(51) Int. Cl.
*F16H 61/70* (2006.01)
(52) U.S. Cl. ........................ 475/208; 475/209
(58) Field of Classification Search .............. 475/208, 475/209, 121
See application file for complete search history.

(56) References Cited

U.S. PATENT DOCUMENTS

| | | |
|---|---|---|
| 4,672,863 A | 6/1987 | Itoh et al. |
| 4,674,359 A | 6/1987 | Hattori |
| 4,793,217 A | 12/1988 | Morisawa et al. |
| 5,207,122 A | 5/1993 | Minagawa |
| 5,282,401 A | 2/1994 | Hebbale et al. |
| 5,427,579 A | 6/1995 | Kanehara et al. |
| 5,456,647 A | 10/1995 | Holbrook |
| 5,468,198 A | 11/1995 | Holbrook et al. |
| 5,827,153 A | 10/1998 | Yasue et al. |
| 5,947,856 A | 9/1999 | Tabata et al. |
| 6,157,884 A | 12/2000 | Narita et al. |
| 6,295,497 B1 | 9/2001 | Kuras |
| 7,108,631 B2 | 9/2006 | Inoue et al. |
| 7,637,836 B2 | 12/2009 | Watanabe et al. |
| 7,780,570 B2 | 8/2010 | Iwatsuki et al. |
| 8,052,572 B2 | 11/2011 | Unno |
| 8,131,436 B2 | 3/2012 | Suzuki et al. |
| 8,187,145 B2 | 5/2012 | Kaminsky et al. |

(Continued)

FOREIGN PATENT DOCUMENTS

DE  34 24 646 A1  2/1985

(Continued)

OTHER PUBLICATIONS

U.S. Appl. No. 12/836,021, filed Jul. 14, 2010, Nonomura et al.

(Continued)

*Primary Examiner* — Sherry Estremsky
(74) *Attorney, Agent, or Firm* — Foley & Lardner LLP (57) ABSTRACT

A control device for a vehicle continuously variable transmission 4 comprises: inertia phase processing completing means for completing an instruction relating to inertia phase processing before an input rotation speed of the subtransmission mechanism 30 actually reaches an input rotation speed of the second gear position; and torque phase processing starting means for starting an instruction relating to torque phase processing, in which reception of an input torque of the subtransmission mechanism 30 is shifted from a disengagement side frictional engagement element to an engagement side frictional engagement element before the input rotation speed of the subtransmission mechanism 30 actually reaches the input rotation speed of the second gear position, after completing the instruction relating to the inertia phase processing.

4 Claims, 6 Drawing Sheets

U.S. PATENT DOCUMENTS

| | | | |
|---|---|---|---|
| 8,204,659 | B2 | 6/2012 | Kouno et al. |
| 8,214,093 | B2 | 7/2012 | Heap et al. |
| 2006/0089775 | A1 | 4/2006 | Whitton et al. |
| 2007/0129922 | A1 | 6/2007 | Lee et al. |
| 2008/0020896 | A1 | 1/2008 | Kamishima |
| 2008/0032861 | A1 | 2/2008 | Maki et al. |
| 2008/0096721 | A1 | 4/2008 | Honma et al. |
| 2009/0105041 | A1 | 4/2009 | McKenzie et al. |
| 2009/0111650 | A1 | 4/2009 | Jeon |
| 2010/0057316 | A1 | 3/2010 | Tanaka et al. |
| 2010/0227736 | A1* | 9/2010 | Takahashi et al. ............... 477/86 |
| 2010/0228412 | A1* | 9/2010 | Sah ............... 701/22 |
| 2011/0015839 | A1* | 1/2011 | Takahashi et al. ............... 701/55 |

FOREIGN PATENT DOCUMENTS

| | | |
|---|---|---|
| DE | 100 51 692 A1 | 5/2001 |
| DE | 10 2005 050 615 A1 | 4/2006 |
| EP | 0 199 533 A1 | 10/1986 |
| EP | 0 217 221 A2 | 4/1987 |
| EP | 0 959 270 A2 | 11/1999 |
| GB | 2 144 814 A | 3/1985 |
| JP | 60-037455 A | 2/1985 |
| JP | 61-31752 A | 2/1986 |
| JP | 61-103049 A | 5/1986 |
| JP | 61-241562 A | 10/1986 |
| JP | 62-137239 A | 6/1987 |
| JP | 62-132831 U | 8/1987 |
| JP | 63-266264 A | 11/1988 |
| JP | 63-266265 A | 11/1988 |
| JP | 4-211760 A | 8/1992 |
| JP | 5-10427 A | 1/1993 |
| JP | 05-026317 A | 2/1993 |
| JP | 5-71627 A | 3/1993 |
| JP | 5-79554 A | 3/1993 |
| JP | 6-331013 A | 11/1994 |
| JP | 06-331016 A | 11/1994 |
| JP | 8-178043 A | 7/1996 |
| JP | 9-210165 A | 8/1997 |
| JP | 10-299880 A | 11/1998 |
| JP | 11-51162 A | 2/1999 |
| JP | 11-082721 A | 3/1999 |
| JP | 11-093987 A | 4/1999 |
| JP | 11-182663 A | 7/1999 |
| JP | 11-210874 A | 8/1999 |
| JP | 2000-145939 A | 5/2000 |
| JP | 2000-266173 A | 9/2000 |
| JP | 2000-346169 A | 12/2000 |
| JP | 2002-89701 A | 3/2002 |
| JP | 2002-323122 A | 11/2002 |
| JP | 2004-125106 A | 4/2004 |
| JP | 2004-150549 A | 5/2004 |
| JP | 2004-203220 A | 7/2004 |
| JP | 2007-92665 A | 4/2007 |
| JP | 2007-118727 A | 5/2007 |
| JP | 2007-146906 A | 6/2007 |
| JP | 2008-059052 A | 3/2008 |

OTHER PUBLICATIONS

U.S. Appl. No. 12/836,099, filed Jul. 14, 2010, Takahashi et al.
U.S. Appl. No. 12/836,104, filed Jul. 14, 2010, Takahashi et al.
U.S. Appl. No. 12/837,129, filed Jul. 15, 2010, Takahashi et al.
U.S. Appl. No. 12/837,133, filed Jul. 15, 2010, Takahashi et al.
U.S. Appl. No. 12/836,172, filed Jul. 14, 2010, Takahashi et al.
U.S. Appl. No. 12/828,604, filed Jul. 1, 2010, Nonomura et al.
R. Nonomura et al., US PTO Notice of Allowance, U.S. Appl. No. 12/828,604, dated Jun. 7, 2012, (12 pgs.).
R. Nonomura et al., US PTO Notice of Allowance, U.S. Appl. No. 12/828,604, dated Feb. 13, 2012, (17 pgs.).
S. Takahashi et al., US PTO Notice of Allowance on U.S. Appl. No. 12/836,021 DTD Oct. 5, 2012, (17 pgs.).
S. Takahashi et al., US PTO Office Action on U.S. Appl. No. 12/836,099 DTD Sep. 18, 2012, (23 pgs.).
S. Takahashi et al. US PTO Office Action on U.S. Appl. No. 12/836,104 DTD Sep. 24, 2012, (24 pgs.).
S. Takahashi et al., US PTO Notice of Allowance on U.S. Appl. No. 12/837,129 DTD Oct. 11, 2012, (20 pgs.).
S. Takahashi et al., US PTO Notice of Allowance on U.S. Appl. No. 12/836,172 DTD Oct. 19, 2012, (20 pgs.).

* cited by examiner

CONTROL OF AND CONTROL METHOD FOR VEHICLE CONTINUOUSLY VARIABLE TRANSMISSION

This application claims priority from Japanese Patent Application 2009-169171, filed Jul. 17, 2009, which is incorporated herein by reference in its entirety.

FIELD OF THE INVENTION

This invention relates to control of and a control method for a vehicle continuously variable transmission.

BACKGROUND OF THE INVENTION

JPH5-79554A, published by the Japan Patent Office in 2002, discloses a control device for a vehicle continuously variable transmission that includes, in addition to a continuously variable transmission mechanism, a subtransmission mechanism which can be switched between a plurality of gear positions, in which the continuously variable transmission mechanism is downshifted when the gear position of the subtransmission mechanism is upshifted.

SUMMARY OF THE INVENTION

However, in the conventional control device for a vehicle continuously variable transmission described above, when the gear position of the subtransmission mechanism is upshifted while torque input into the vehicle continuously variable transmission is negative torque, a hydraulic response delay occurs in a disengagement side frictional engagement element of the subtransmission mechanism, leading to a reduction in drivability.

It is therefore an object of this invention to improve drivability when a gear position of a subtransmission mechanism is upshifted while torque input into a vehicle continuously variable transmission is negative torque.

To achieve the object described above, this invention is a control device for a vehicle continuously variable transmission comprising: a continuously variable transmission mechanism having a speed ratio that can be modified continuously; and a subtransmission mechanism that is provided in series with the continuously variable transmission mechanism, includes a first gear position and a second gear position, the second gear position having a smaller speed ratio than the first gear position, as forward gear positions, and switches between the first gear position and the second gear position by engaging or disengaging a plurality of frictional engagement elements selectively, wherein an instruction relating to inertia phase processing, which is implemented during a process for modifying the gear position of the subtransmission mechanism from the first gear position to the second gear position when a torque input into the vehicle continuously variable transmission is negative torque to adjust an input rotation variation speed of the subtransmission mechanism by controlling an engagement capacity of the frictional engagement elements of the subtransmission mechanism, is completed before an input rotation speed of the subtransmission mechanism actually reaches an input rotation speed of the second gear position; and an instruction relating to torque phase processing, in which reception of the input torque of the subtransmission mechanism is shifted from a disengagement side frictional engagement element to an engagement side frictional engagement element before the input rotation speed of the subtransmission mechanism actually reaches the input rotation speed of the second gear position, is started after completing the instruction relating to the inertia phase processing.

Details of this invention as well as other features and advantages thereof are set forth in the following description of the specification and illustrated in the attached drawings.

DESCRIPTION OF THE PREFERRED EMBODIMENT

An embodiment of this invention will be described below with reference to the attached drawings. It should be noted that in the following description, a "speed ratio" of a certain transmission mechanism is a value obtained by dividing an input rotation speed of the transmission mechanism by an output rotation speed of the transmission mechanism. Further, a "Lowest speed ratio" denotes a maximum speed ratio of the transmission mechanism, and a "Highest speed ratio" denotes a minimum speed ratio of the transmission mechanism.

Figure 1:
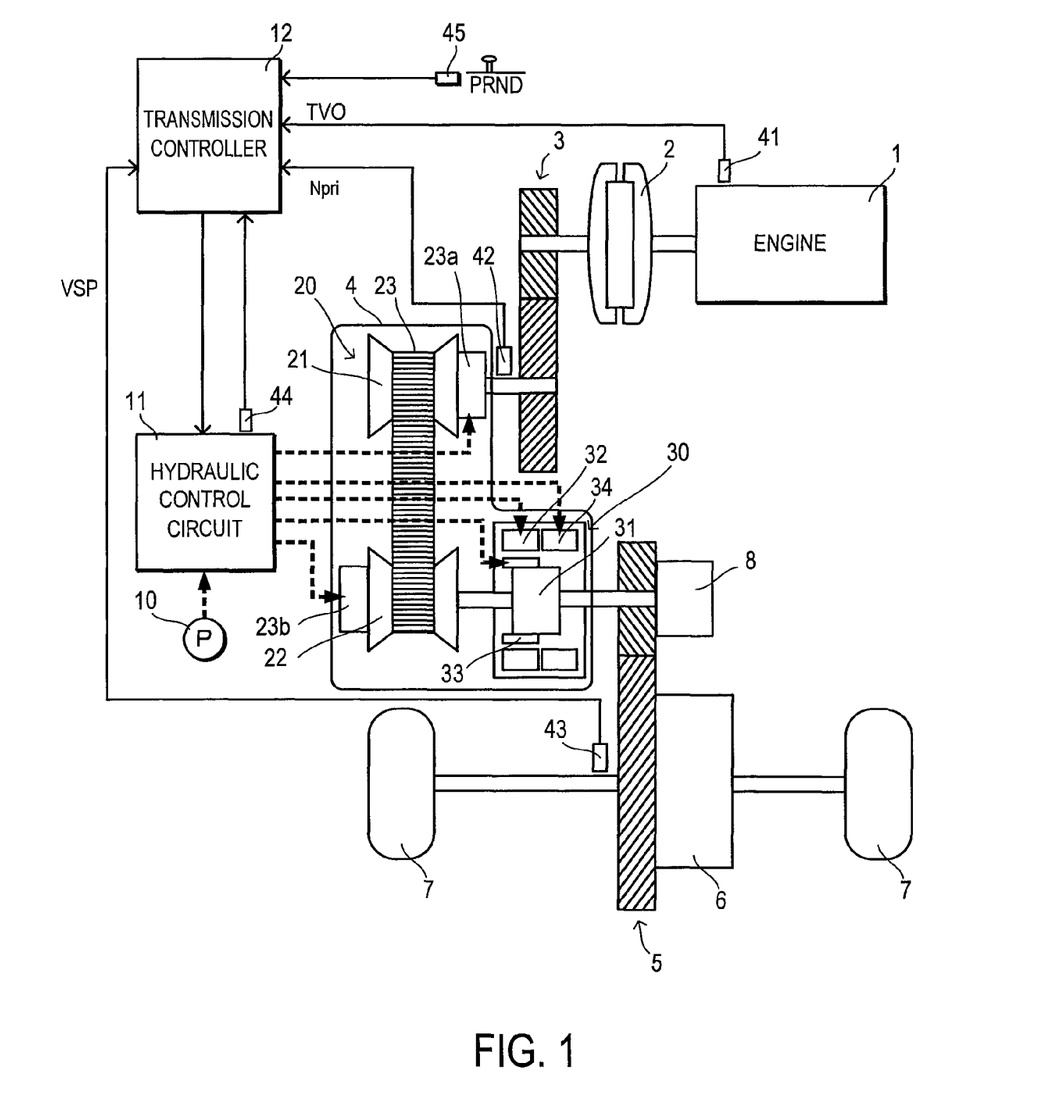
FIG. 1 is a schematic diagram showing the constitution of a vehicle installed with a continuously variable transmission according to an embodiment of this invention.

FIG. 1 is a schematic constitutional diagram of a vehicle installed with a continuously variable transmission according to an embodiment of this invention. The vehicle has an internal combustion engine 1 as a power source. Output rotation of the engine 1 is transmitted to a drive wheel 7 via a torque converter having a lockup clutch 2, a first gear train 3, a continuously variable transmission (to be referred to as a "transmission 4" hereafter), a second gear train 5, and a final reduction gear 6. The second gear train 5 is provided with a parking mechanism 8 which locks an output shaft of the transmission 4 mechanically so that the output shaft is incapable of rotation during parking.

The vehicle is further provided with an oil pump 10 which is driven using a part of the power of the engine 1, a hydraulic control circuit 11 which regulates an oil pressure from the oil pump 10 and supplies the regulated oil pressure to various sites of the transmission 4, and a transmission controller 12 which controls the hydraulic control circuit 11. The hydraulic control circuit 11 and the transmission controller 12 together constitute shift control means.

To describe the respective constitutions, the transmission 4 includes a belt type continuously variable transmission mechanism (to be referred to as a "variator 20" hereafter), and a subtransmission mechanism 30 provided to the rear of and in series with the variator 20. The term "provided to the rear of" means that the subtransmission mechanism 30 is provided further toward the drive wheel 7 side than the variator 20 on a power transmission path extending from the engine 1 to the drive wheel 7. Further, the term "provided in series" means that the variator 20 and the subtransmission mechanism 30 are provided in series on this power transmission path. The subtransmission mechanism 30 may be directly connected to an output shaft of the variator 20, as in this example, or via another transmission mechanism or power transmission mechanism (for example, a gear train).

The variator 20 includes a primary pulley 21, a secondary pulley 22, and a V belt 23 wrapped around the pulleys 21, 22. The pulleys 21, 22 respectively include a fixed conical plate, a movable conical plate that is disposed relative to the fixed conical plate such that respective sheave surfaces thereof oppose each other and forms a V groove with the fixed conical plate, and a hydraulic cylinder 23a, 23b that is provided on a back surface of the movable conical plate and displaces the movable conical plate in an axial direction. When an oil pressure supplied to the hydraulic cylinder 23a, 23b is varied, the width of the V groove varies, leading to variation in a contact radius between the V belt 23 and the pulley 21, 22, and as a result, a speed ratio vRatio of the variator 20 varies continuously.

The subtransmission mechanism 30 is a two-forward speed, one-reverse speed transmission mechanism. The subtransmission mechanism 30 includes a Ravigneaux planetary gear mechanism 31 coupling the carriers of two planetary gear sets, and a plurality of frictional engagement elements (a Low brake 32, a High clutch 33, and a Rev brake 34) connected to a plurality of rotary elements constituting the Ravigneaux planetary gear mechanism 31 to modify the rotation states thereof. The gear position of the subtransmission mechanism 30 is changed by adjusting the oil pressure supplied to the respective frictional engagement elements 32 to 34 such that the engagement/disengagement states of the respective frictional engagement elements 32 to 34 are modified. For example, by engaging the Low brake 32 and disengaging the High clutch 33 and Rev brake 34, the gear position of the subtransmission mechanism 30 is set in a first speed. By engaging the High clutch 33 and disengaging the Low brake 32 and Rev brake 34, the gear position of the subtransmission mechanism 30 is set in a second speed having a smaller speed ratio than the first speed. By engaging the Rev brake 34 and disengaging the Low brake 32 and the High clutch 33, the gear position of the subtransmission mechanism 30 is set in reverse. It should be noted that in the following description, a state in which the gear position of the subtransmission mechanism 30 is in the first speed will be expressed as "the transmission 4 is in a low speed mode", and a state in which the gear position of the subtransmission mechanism 30 is in the second speed will be expressed as "the transmission 4 is in a high speed mode".

Figure 2:
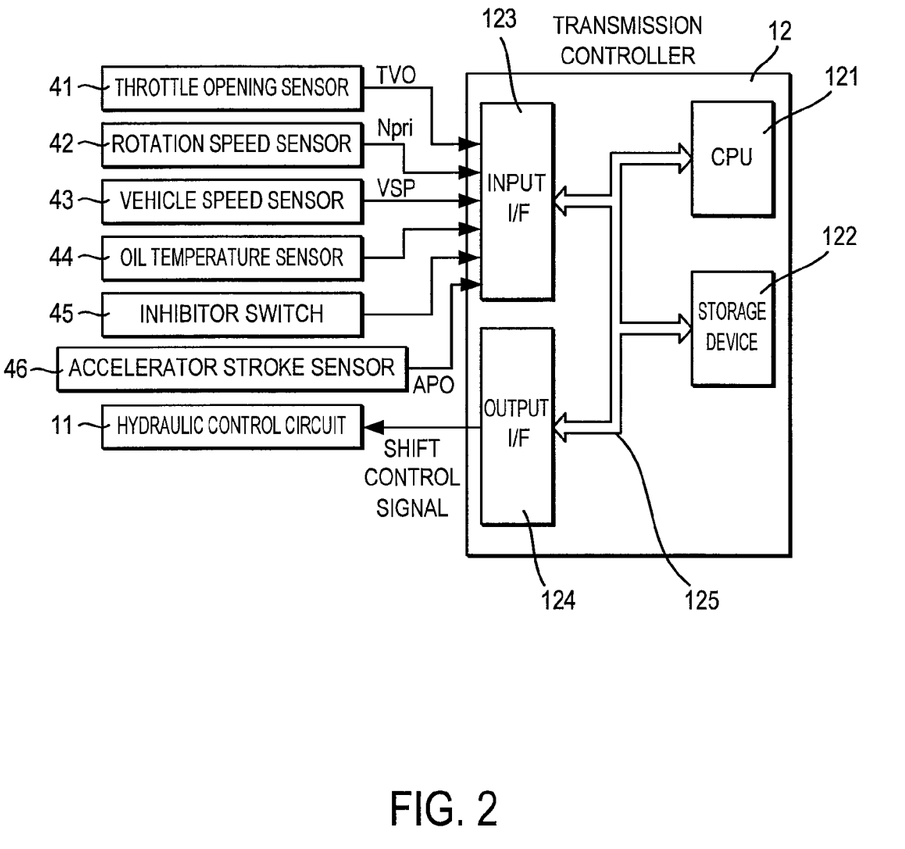
FIG. 2 is a view showing the internal constitution of a transmission controller according to this embodiment of this invention.

As shown in FIG. 2, the transmission controller 12 is constituted by a CPU 121, a storage device 122 including a RAM and a ROM, an input interface 123, an output interface 124, and a bus 125 connecting these components to each other.

Output signals and the like are input into the input interface 123 from a throttle opening sensor 41, a rotation speed sensor 42, a vehicle speed sensor 43, an oil temperature sensor 44, an inhibitor switch 45, and an accelerator stroke sensor 46. The throttle opening sensor 41 detects an opening (to be referred to hereafter as a "throttle opening") TVO of a throttle valve of the engine 1. The rotation speed sensor 42 detects an input rotation speed (=the rotation speed of the primary pulley 21; to be referred to hereafter as a "primary rotation speed") Npri of the transmission 4. The vehicle speed sensor 43 detects a travel speed (to be referred to hereafter as a "vehicle speed") VSP of the vehicle. The oil temperature sensor 44 detects an oil temperature of the transmission 4. The inhibitor switch 45 detects a position of a select lever provided in the vehicle. The accelerator stroke sensor 46 detects a depression amount APO of an accelerator pedal.

The storage device 122 stores a shift control program for the transmission 4 and a shift map (FIG. 4) used by the shift control program. The CPU 121 reads and executes the shift control program stored in the storage device 122, generates a shift control signal by implementing various types of calculation processing on the various signals input via the input interface 123, and outputs the generated shift control signal to the hydraulic control circuit 11 via the output interface 124. Various values used in the calculation processing executed by the CPU 121 and calculation results thereof are stored in the storage device 122 as appropriate.

The hydraulic control circuit 11 is constituted by a plurality of flow passages and a plurality of hydraulic control valves. The hydraulic control circuit 11 controls the plurality of hydraulic control valves on the basis of the shift control signal from the transmission controller 12 to switch an oil pressure supply path, and prepares a required oil pressure from the oil pressure generated by the oil pump 10, which is then supplied to various sites of the transmission 4. As a result, the speed ratio vRatio of the variator 20 is modified and the gear position of the subtransmission mechanism 30 is changed, whereby a shift is performed in the transmission 4.

Figure 3:
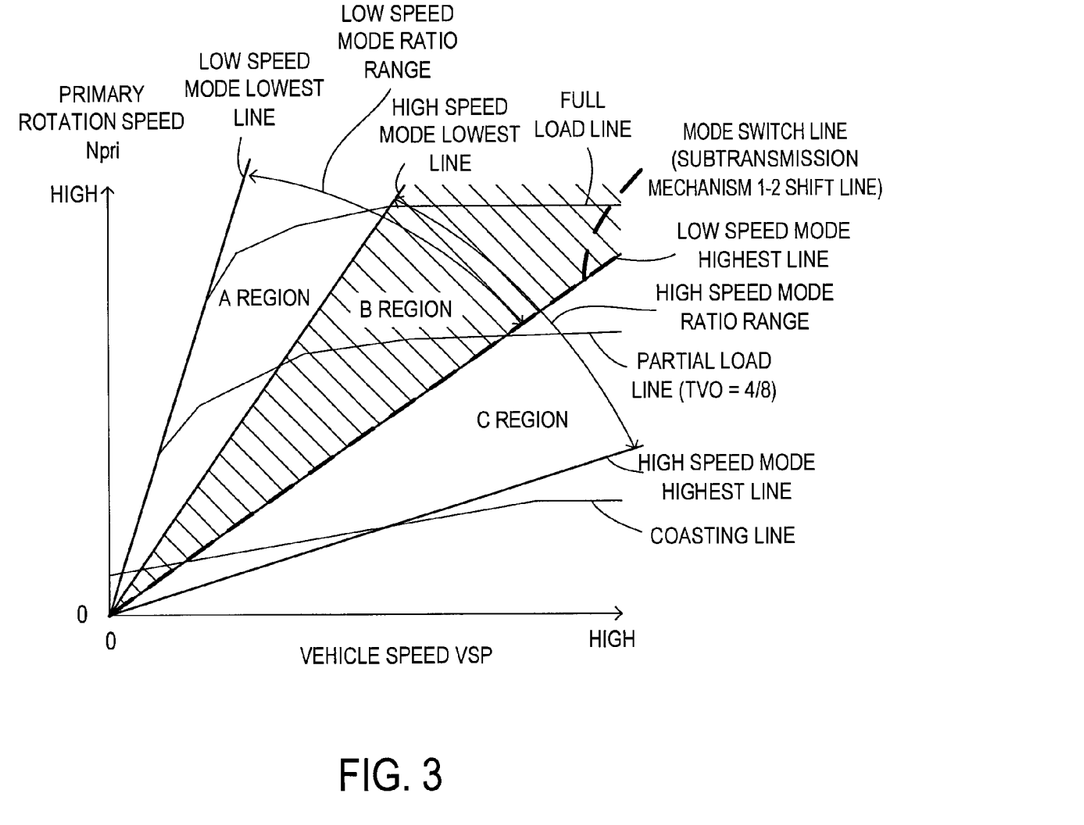
FIG. 3 is a view showing an example of a shift map of the transmission according to this embodiment of this invention.

FIG. 3 shows an example of the shift map stored in the storage device 122 of the transmission controller 12.

On the shift map, an operating point of the transmission 4 is determined on the basis of the vehicle speed VSP and the primary rotation speed Npri. An incline of a line linking the operating point of the transmission 4 and a zero point in the lower left corner of the shift map indicates the speed ratio of the transmission 4 (an overall speed ratio obtained by multiplying the speed ratio of the subtransmission mechanism 30 with the speed ratio vRatio of the variator 20, to be referred to hereafter as a "through speed ratio Ratio").

On this shift map, similarly to a shift map of a conventional belt type continuously variable transmission, a shift line is set at each throttle opening TVO, and a shift is performed in the transmission 4 according to a shift line selected in accordance with the throttle opening TVO. For ease of understanding, FIG. 3 shows only a full load line (a shift line used when the throttle opening TVO=8/8), a partial load line (a shift line used when the throttle opening TVO=4/8), and a coasting line (a shift line used when the throttle opening TVO=0).

When the transmission 4 is in the low speed mode, the transmission 4 can be shifted between a low speed mode Lowest line, which is obtained by maximizing the speed ratio vRatio of the variator 20, and a low speed mode Highest line, which is obtained by minimizing the speed ratio vRatio of the variator 20. In the low speed mode, the operating point of the transmission 4 moves within an A region and a B region.

When the transmission 4 is in the high speed mode, the transmission 4 can be shifted between a high speed mode Lowest line, which is obtained by maximizing the speed ratio vRatio of the variator 20, and a high speed mode Highest line, which is obtained by minimizing the speed ratio vRatio of the variator 20. In the high speed mode, the operating point of the transmission 4 moves within the B region and a C region.

The speed ratios of the respective gear positions of the subtransmission mechanism 30 are set such that a speed ratio corresponding to the low speed mode Highest line (low speed mode Highest speed ratio) is smaller than a speed ratio corresponding to the high speed mode Lowest line (high speed mode Lowest speed ratio). In so doing, a low speed mode ratio range, which is the through speed ratio Ratio range of the transmission 4 in the low speed mode, and a high speed mode ratio range, which is the through speed ratio Ratio range of the transmission 4 in the high speed mode, partially overlap such that when the operating point of the transmission 4 is in the B region, which is sandwiched between the high speed mode Lowest line and the low speed mode Highest line, the transmission 4 can select either the low speed mode or the high speed mode.

Further, a mode switch shift line (a 1-2 shift line of the subtransmission mechanism 30) at which the subtransmission mechanism 30 performs a shift is set on the shift map to overlap the low speed mode Highest line. A through speed ratio corresponding to the mode switch shift line (to be referred to hereafter as a "mode switch speed ratio") mRatio is set at an equal value to the low speed mode Highest speed ratio. When the operating point of the transmission 4 crosses the mode switch shift line, or in other words when the through speed ratio Ratio of the transmission 4 varies across the mode switch speed ratio mRatio, a mode switch shift is performed. Hereafter, a series of shift control operations performed during a mode switch shift will be referred to collectively as "mode switch shift control".

During a mode switch shift, the transmission controller 12 performs a shift in the subtransmission mechanism 30 and modifies a speed ratio vRatio of the variator 20 in an opposite direction to a variation direction of the speed ratio of the subtransmission mechanism 30.

More specifically, when the through speed ratio Ratio of the transmission 4 shifts from a state of being larger than the mode switch speed ratio mRatio to a state of being smaller, the transmission controller 12 modifies the gear position of the subtransmission mechanism 30 from the first speed to the second speed (a subtransmission mechanism 1-2 shift) and modifies the speed ratio vRatio of the variator 20 to a large speed ratio side.

Conversely, when the through speed ratio Ratio of the transmission 4 shifts from a state of being smaller than the mode switch speed ratio mRatio to a state of being larger, the transmission controller 12 modifies the gear position of the subtransmission mechanism 30 from the second speed to the first speed (a subtransmission mechanism 2-1 shift) and modifies the speed ratio vRatio of the variator 20 to a small speed ratio side.

The reason for causing the speed ratio vRatio of the variator 20 to vary in the opposite direction to the speed ratio variation direction of the subtransmission mechanism 30 during a mode switch shift is to ensure that input rotation variation due to a step occurring in the through speed ratio Ratio of the transmission 4 does not cause the driver to experience an unpleasant sensation.

Incidentally, shifts performed by the transmission 4 include shifts performed in a power ON state and shifts performed in a power OFF state.

A shift performed in the power ON state is an upshift or a downshift performed when the accelerator pedal is depressed, or in other words when the input torque of the transmission 4 is positive torque (torque at which an input side of the transmission 4 shifts to a drive side). A shift performed in the power OFF state is an upshift or a downshift performed when the accelerator pedal is not depressed, or in other words when the input torque of the transmission 4 is negative torque (torque at which an output side of the transmission 4 shifts to the drive side).

An object of this embodiment is to improve drivability when a mode switch shift is performed during an upshift in the power OFF state (to be referred to hereafter as a "power OFF upshift"), from among the four types of shifts described above. Mode switch shift control executed during a power OFF upshift according to this embodiment will be described below after describing problems that arise when the mode switch shift control according to this embodiment is not implemented.

FIGS. 6A-6G are time charts of a comparative example illustrating the problems that arise when the mode switch shift control according to this embodiment is not implemented.

As shown in FIGS. 6A-6G, in the case of a power OFF upshift accompanying a mode switch shift, the subtransmission mechanism 30 achieves a switch from the low speed mode to the high speed mode by performing preparatory phase processing, inertia phase processing, and torque phase processing.

The preparatory phase processing is processing for preparing to modify the gear position of the subtransmission mechanism 30. More specifically, in the preparatory phase processing, a command oil pressure of a disengagement side frictional engagement element of the subtransmission mechanism 30 is reduced to an initial disengagement pressure (a pressure at which the disengagement side frictional engagement element begins to slide), and a command oil pressure of an engagement side frictional engagement element is held at a precharge pressure for a predetermined time and then lowered to an initial engagement pressure (a pressure at which torque can be transmitted by the engagement side frictional engagement element).

The inertia phase processing is processing for shifting an input rotation speed of the subtransmission mechanism 30 from a pre-shift rotation speed to a post-shift rotation speed. More specifically, in the inertia phase processing, an input rotation variation speed of the subtransmission mechanism 30 is adjusted by controlling the oil pressure of the disengagement side frictional engagement element to increase or decrease an engagement capacity thereof such that the input rotation speed of the subtransmission mechanism 30 is reduced by a desired proportion.

The torque phase processing is processing for shifting reception of the input torque of the subtransmission mechanism 30 from the disengagement side frictional engagement element to the engagement side frictional engagement element. More specifically, in the torque phase processing, the oil pressure of the disengagement side frictional engagement element is reduced toward zero while the oil pressure of the engagement side frictional engagement element is increased from the initial engagement pressure (the engagement capacity thereof is increased).

Figure 6A:
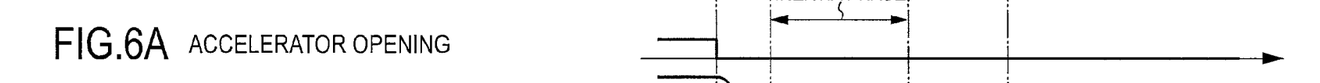
FIGS. 6A-6G are time charts illustrating a mode switch shift control operation performed during a power OFF upshift according to a comparative example.
Figures 6B, 6C:
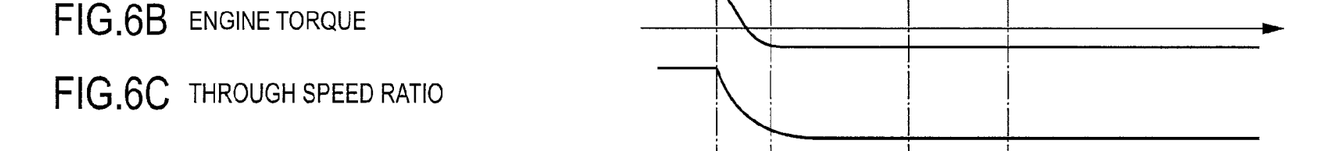
Figures 6D, 6E, 6F:
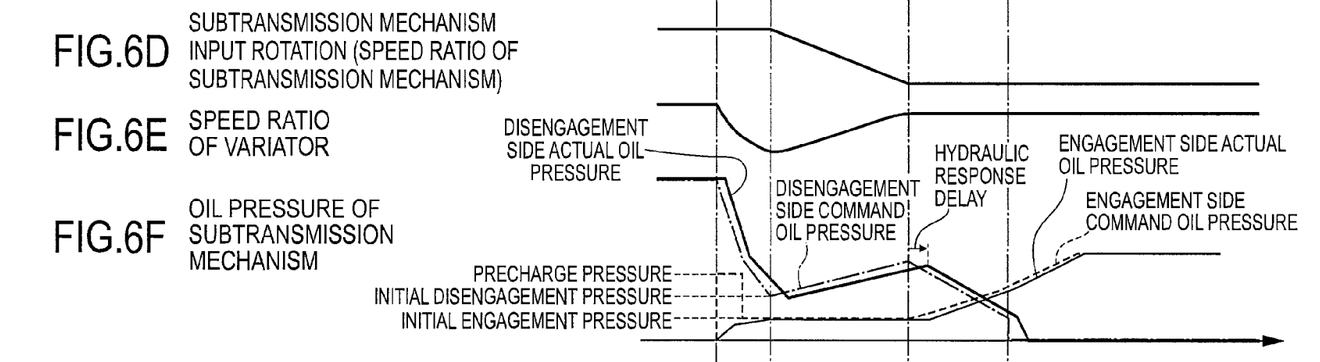

As shown in FIGS. 6A-6G, during the inertia phase processing, the speed ratio of the subtransmission mechanism 30 is gradually modified to the small speed ratio side, and in accordance therewith, the speed ratio vRatio of the variator 20 is modified to the large speed ratio side (FIG. 6D, FIG. 6E). As the speed ratio vRatio of the variator 20 is gradually modified to the large speed ratio side, engine braking increases, and as a result, a deceleration/acceleration$^i$ of the vehicle increases (FIG. 6D). During a power OFF upshift, the inertia phase processing is implemented before the torque phase processing. Therefore, during the inertia phase processing, torque is transmitted by the disengagement side (first speed side) frictional engagement element of the subtransmission mechanism 30, and as a result, engine brake application increases.

Figure 6G:
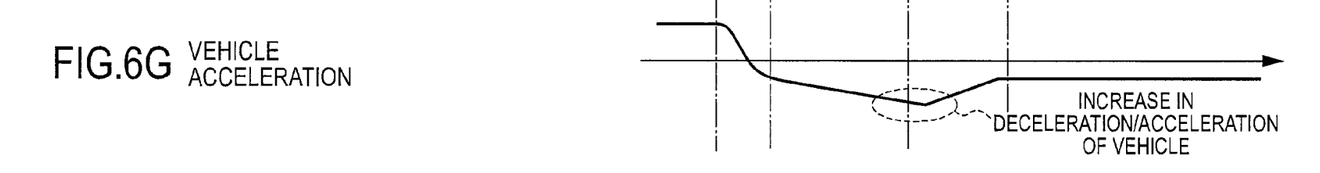

When the torque phase processing begins, torque is transmitted by the engagement side (second speed side) frictional engagement element of the subtransmission mechanism 30, and therefore engine brake application weakens such that the deceleration/acceleration of the vehicle gradually decreases (FIG. 6G).

In this comparative example, the inertia phase processing ends when the input rotation speed of the subtransmission mechanism 30 shifts from the pre-shift rotation speed to a post-shift rotation speed. In other words, a period in which the inertia phase processing is implemented perfectly matches a period (to be referred to hereafter as an "actual inertia phase") in which the input rotation speed of the subtransmission mechanism 30 actually shifts from the pre-shift rotation speed to the post-shift rotation speed.

Therefore, when the inertia phase processing is terminated simultaneously with the end of the actual inertia phase, a hydraulic response delay occurs in the disengagement side frictional engagement element (FIG. 6F), and as a result, torque continues to be transmitted by the disengagement side (first speed side) frictional engagement element of the subtransmission mechanism 30 in the initial period of the torque phase. This leads to a problem in that the deceleration/acceleration of the vehicle increases more than necessary (FIG. 6G).

This problem is solved in this embodiment by terminating the inertia phase processing and starting the torque phase processing before the end of the actual inertia phase, or in other words during the actual inertia phase.

Figure 4:
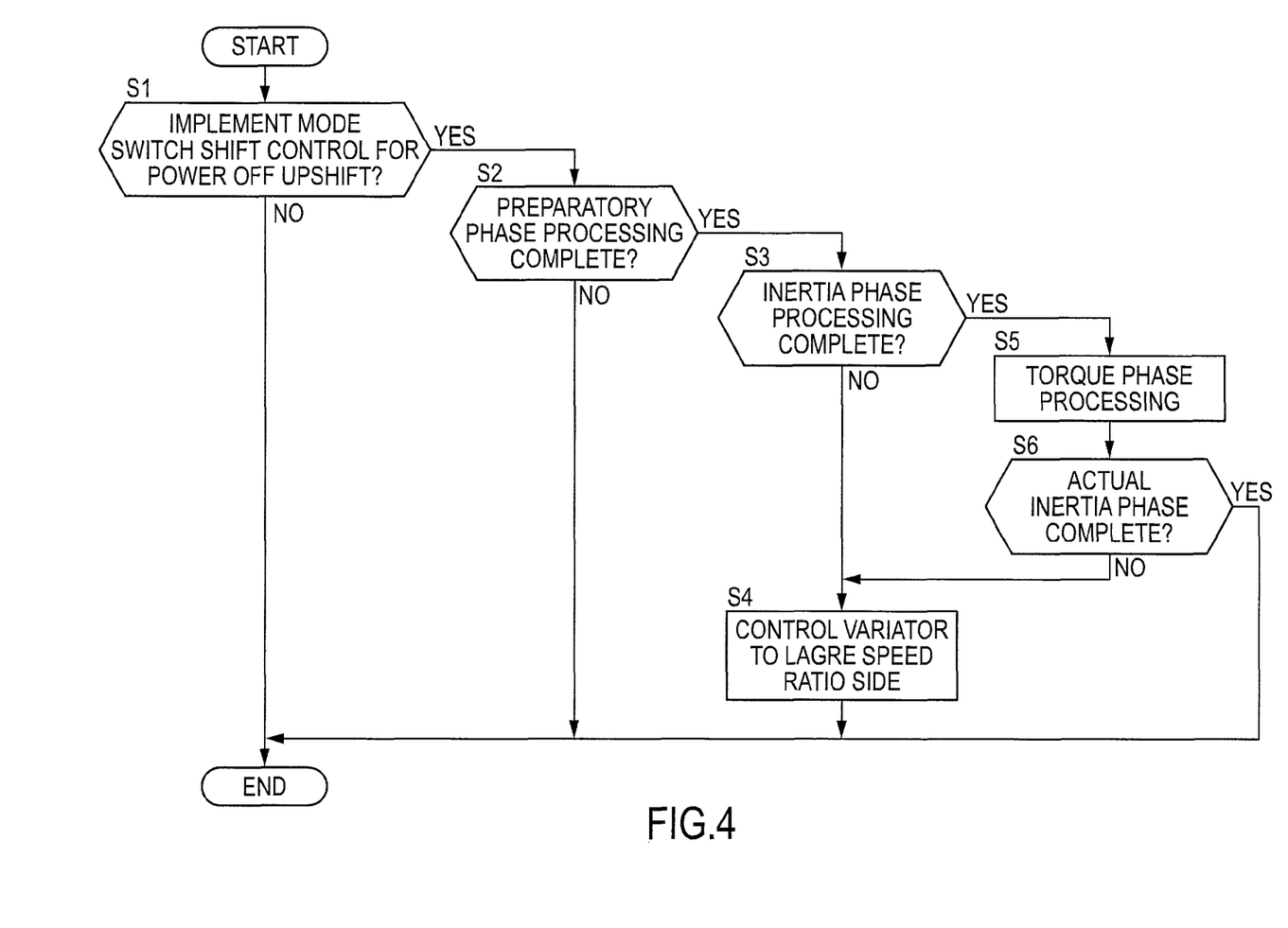
FIG. 4 is a flowchart showing the content of a shift control program according to this embodiment of this invention, which is executed by the transmission controller.

FIG. 4 shows an example of a shift control program stored in the storage device 122 of the transmission controller 12. The transmission controller 12 executes this routine repeatedly in predetermined calculation periods. In this embodiment, the predetermined calculation period is set at 10 ms. The specific content of the shift control executed by the transmission controller 12 will now be described with reference to FIG. 4.

In a step S1, the transmission controller 12 determines whether or not to implement mode switch shift control for a power OFF upshift. More specifically, the transmission controller 12 determines whether or not the accelerator pedal depression amount APO is substantially zero and the operating point of the transmission 4 is about to cross the mode switch shift line. When mode switch shift control for a power OFF upshift is to be implemented, the transmission controller 12 performs the processing of a step S2, and when mode switch shift control for a power OFF upshift is not to be implemented, the transmission controller 12 terminates the current processing.

In the step S2, the transmission controller 12 determines whether or not the preparatory phase processing is complete. More specifically, the transmission controller 12 determines that the preparatory phase processing is complete when a precharge completion time has elapsed following the start of the preparatory phase processing and the input rotation speed of the subtransmission mechanism 30 has begun to decrease. The precharge completion time is a time at which it can be determined that precharging of the engagement side frictional engagement element is complete. When the preparatory phase processing is complete, the transmission controller 12 performs the processing of a step S3, and when the preparatory phase processing is not complete, the transmission controller 12 continues to perform the preparatory phase processing.

In the step S3, the transmission controller 12 determines whether or not the inertia phase processing is complete. More specifically, the transmission controller 12 determines that the inertia phase processing is complete when the input rotation speed of the subtransmission mechanism 30 has reached an inertia phase processing completion determination speed, which is higher than the post-shift input rotation speed by a predetermined rotation. The inertia phase processing completion determination speed is set at a rotation speed at which an actual pressure begins to respond when the input rotation speed of the subtransmission mechanism 30 reaches the post-shift input rotation speed, taking into account the hydraulic response delay of the disengagement side frictional engagement element. In this embodiment, the inertia phase processing completion determination speed is set at (post-shift input rotation speed of subtransmission mechanism 30)+100 rpm. When the input rotation speed of the subtransmission mechanism 30 has reached the inertia phase processing completion determination speed, the transmission controller 12 terminates the inertia phase processing and performs the processing of a step S5. When the input rotation speed of the subtransmission mechanism 30 is higher than the inertia phase processing completion determination speed, on the other hand, the transmission controller 12 continues to implement the inertia phase processing and performs the processing of a step S4.

In the step S4, the transmission controller 12 modifies the speed ratio vRatio of the variator 20 to the large speed ratio side.

In the step S5, the transmission controller 12 implements the torque phase processing.

In a step S6, the transmission controller 12 determines whether or not the actual inertia phase is complete. More specifically, the transmission controller 12 determines whether or not the input rotation speed of the subtransmission mechanism 30 has actually reached the post-shift input rotation speed. When the actual inertia phase is complete, the transmission controller 12 terminates the current processing, and when the actual inertia phase is not complete, the transmission controller 12 performs the processing of the step S4.

FIGS. 5A-5G are time charts illustrating a mode switch shift control operation performed during a power OFF upshift according to this embodiment.

Figure 5A:
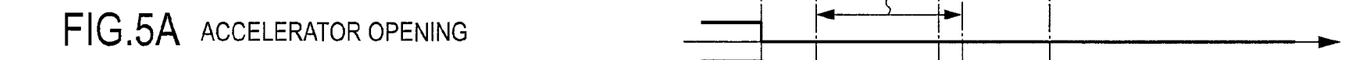
FIGS. 5A-5G are time charts illustrating a mode switch shift control operation performed during a power OFF upshift according to this embodiment of this invention.
Figure 5B:
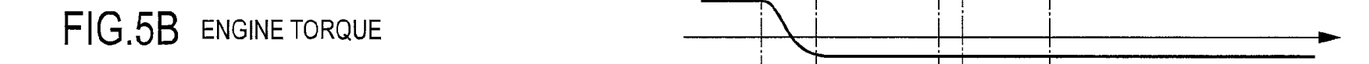
Figure 5C:
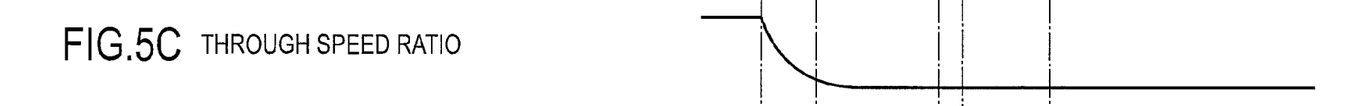
Figure 5D:
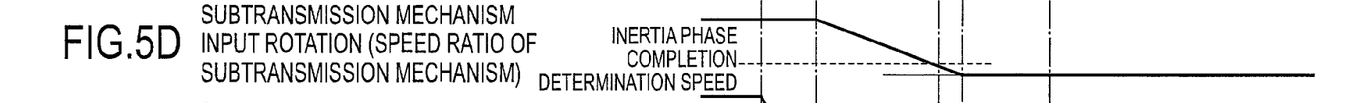
Figures 5E, 5F:
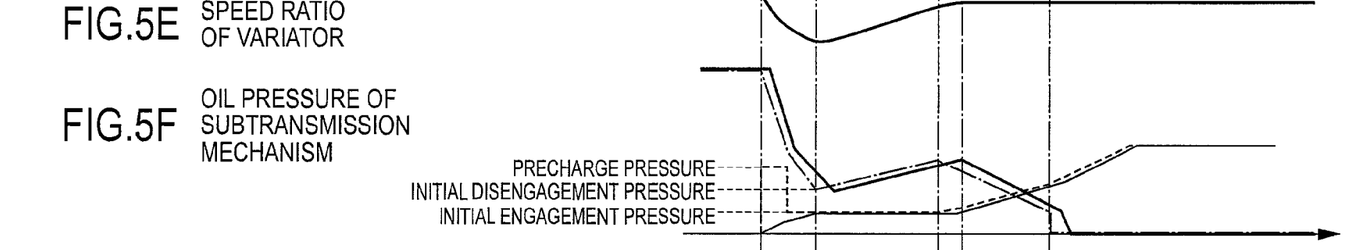
Figure 5G:
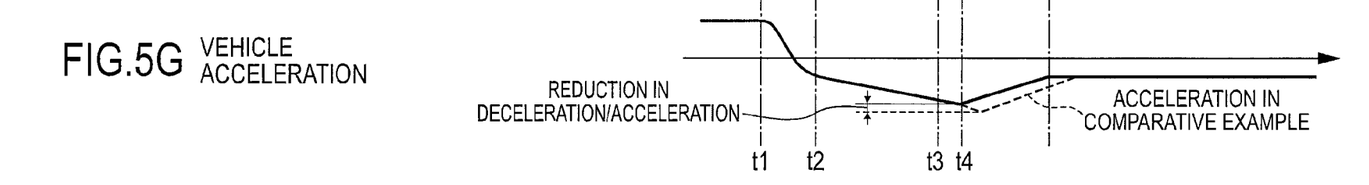

When a foot is removed from the accelerator pedal at a time t1, a destination through gear ratio DRatio (target value) is modified. When it is determined, as a result of a comparison between the destination through gear ratio DRatio and the through speed ratio Ratio (current value), that a shift across the mode switch shift line is required, the transmission controller 12 implements the mode switch shift control for a power OFF upshift. It is assumed here that a shift across the mode switch shift line is required. Hence, the mode switch shift control for a power OFF upshift is started at the time t1, whereby the speed ratio vRatio of the variator 20 is modified to the small speed ratio side (FIG. 5E) and the preparatory phase processing for modifying the gear position of the subtransmission mechanism 30 from the first speed to the second speed is implemented (FIG. 5F).

When two conditions according to which the precharge completion time has elapsed and the input rotation speed of the subtransmission mechanism 30 has started to decrease are satisfied at a time t2, the preparatory phase processing ends. Accordingly, the inertia phase processing is implemented to modify the speed ratio vRatio of the variator 20 to the large speed ratio side (FIG. 5E) and shift the input rotation speed of the subtransmission mechanism 30 from the pre-shift rotation speed to the post-shift rotation speed (FIG. 5D, FIG. 5F).

When the input rotation speed of the subtransmission mechanism 30 reaches the inertia phase processing completion determination speed at a time t3 (FIG. 5D), the inertia phase processing ends. Accordingly, the torque phase processing is implemented to shift reception of the input torque of the subtransmission mechanism 30 from the disengagement side frictional engagement element to the engagement side frictional engagement element (FIG. 5F).

At a time t4, the actual inertia phase ends.

Hence, in this embodiment, the inertia phase processing ends and the torque phase processing is implemented at the time t3 during the actual inertia phase, taking into account the hydraulic response delay of the disengagement side frictional engagement element. Therefore, in an initial torque phase period starting from the time t4, at which the actual inertia phase ends, torque transmission by the disengagement side (first speed side) frictional engagement element of the subtransmission mechanism 30 can be suppressed. As a result, the increase in the deceleration/acceleration of the vehicle that occurs in the initial torque phase period in the comparative example can be suppressed, leading to an improvement in drivability.

It should be noted that this invention is not limited to the embodiment described above and may be subjected to various modifications within the scope of the technical spirit thereof.

For example, in the above embodiment, the inertia phase processing is terminated as soon as the inertia phase processing completion determination speed is reached, whereupon the torque phase is begun. However, to prevent erroneous determinations due to the effects of noise and fine rotation vibration, the inertia phase processing may be terminated following the elapse of a predetermined time (50 ms, for example) from the point at which the inertia phase processing completion determination speed is reached.

Further, the subtransmission mechanism 30 is a transmission mechanism having a first speed and a second speed as forward gear positions, but the subtransmission mechanism 30 may be a transmission mechanism having three or more gear positions as forward gear positions.

Moreover, the subtransmission mechanism 30 is constituted by a Ravigneaux type planetary gear mechanism but is not limited to this constitution. For example, the subtransmission mechanism 30 may be constituted by a combination of a normal planetary gear mechanism and a frictional engagement element or by a plurality of power transmission paths formed from a plurality of gear trains having different gear ratios and a frictional engagement element for switching the power transmission paths.

Further, the hydraulic cylinders 23a, 23b are provided as actuators that displace the movable conical plates of the pulleys 21, 22 in the axial direction, but the actuators are not limited to hydraulic driving and may be driven electrically.

Furthermore, the mode switch speed ratio is set at an equal value to the low speed mode Highest speed ratio, but here, the term "equal to" includes a case in which the mode switch speed ratio is substantially equal to the low speed mode Highest speed ratio, and this case is also included in the technical scope of this invention.

Moreover, in the above description, a so-called belt type continuously variable transmission mechanism using a belt and pulleys was cited as an example of the continuously variable transmission mechanism, but the continuously variable transmission mechanism is not limited thereto and may be a so-called chain type continuously variable transmission mechanism using a chain and pulleys or a so-called toroidal continuously variable transmission mechanism using a power roller and input/output disks, for example.

The invention claimed is:
1. A control device for a vehicle continuously variable transmission comprising:
    a continuously variable transmission mechanism having a speed ratio that can be modified continuously; and
    a subtransmission mechanism that is provided in series with the continuously variable transmission mechanism, includes a first gear position and a second gear position, the second gear position having a smaller speed ratio than the first gear position, as forward gear positions, and switches between the first gear position and the second gear position by engaging or disengaging a plurality of frictional engagement elements selectively,
wherein the control device comprises a transmission controller programmed to:
complete an instruction relating to inertia phase processing, which is implemented during a process for modifying the gear position of the subtransmission mechanism from the first gear position to the second gear position when a torque input into the vehicle continuously variable transmission is negative torque to adjust an input rotation variation speed of the subtransmission mechanism by controlling an engagement capacity of the frictional engagement elements of the subtransmission mechanism, before an input rotation speed of the subtransmission mechanism actually reaches an input rotation speed of the second gear position; and
start an instruction relating to torque phase processing, in which reception of the input torque of the subtransmission mechanism is shifted from a disengagement side frictional engagement element to an engagement side frictional engagement element before the input rotation speed of the subtransmission mechanism actually reaches the input rotation speed of the second gear position, after completing the instruction relating to the inertia phase processing.

2. The control device for a vehicle continuously variable transmission as defined in claim 1, wherein the transmission controller is further programmed to complete the instruction relating to the inertia phase processing when the input rotation speed of the subtransmission mechanism falls below a predetermined rotation speed that is higher than the input rotation speed of the second gear position.

3. A control device for a vehicle continuously variable transmission comprising:
    a continuously variable transmission mechanism having a speed ratio that can be modified continuously; and
    a subtransmission mechanism that is provided in series with the continuously variable transmission mechanism, includes a first gear position and a second gear position, the second gear position having a smaller speed ratio than the first gear position, as forward gear positions, and switches between the first gear position and the second gear position by engaging and disengaging a plurality of frictional engagement elements selectively,
wherein the control device comprises:
inertia phase processing completing means for completing an instruction relating to inertia phase processing, which is implemented during a process for modifying the gear position of the subtransmission mechanism from the first gear position to the second gear position when a torque input into the vehicle continuously variable transmission is negative torque to adjust an input rotation variation speed of the subtransmission mechanism by controlling an engagement capacity of the frictional engagement elements of the subtransmission mechanism, before an input rotation speed of the subtransmission mechanism actually reaches an input rotation speed of the second gear position; and
torque phase processing starting means for starting an instruction relating to torque phase processing, in which reception of the input torque of the subtransmission mechanism is shifted from a disengagement side frictional engagement element to an engagement side frictional engagement element before the input rotation speed of the subtransmission mechanism actually reaches the input rotation speed of the second gear position, after completing the instruction relating to the inertia phase processing.

4. A control method for a vehicle continuously variable transmission comprising:
   a continuously variable transmission mechanism having a speed ratio that can be modified continuously; and
   a subtransmission mechanism that is provided in series with the continuously variable transmission mechanism, includes a first gear position and a second gear position, the second gear position having a smaller speed ratio than the first gear position, as forward gear positions, and switches between the first gear position and the second gear position by engaging and disengaging a plurality of frictional engagement elements selectively,
   wherein the control method comprises:
   completing an instruction relating to inertia phase processing, which is implemented during a process for modifying the gear position of the subtransmission mechanism from the first gear position to the second gear position when a torque input into the vehicle continuously variable transmission is negative torque to adjust an input rotation variation speed of the subtransmission mechanism by controlling an engagement capacity of the frictional engagement elements of the subtransmission mechanism, before an input rotation speed of the subtransmission mechanism actually reaches an input rotation speed of the second gear position; and
   starting an instruction relating to torque phase processing, in which reception of the input torque of the subtransmission mechanism is shifted from a disengagement side frictional engagement element to an engagement side frictional engagement element before the input rotation speed of the subtransmission mechanism actually reaches the input rotation speed of the second gear position, after completing the instruction relating to the inertia phase processing.

* * * * *